(12) United States Patent
Purzynski

(10) Patent No.: US 8,621,086 B2
(45) Date of Patent: Dec. 31, 2013

(54) SYSTEM AND DOMAIN NAME SERVER FOR AD-HOC NETWORKS

(75) Inventor: Cezary Purzynski, Manalapan, NJ (US)

(73) Assignee: Alcatel Lucent, Paris (FR)

(*) Notice: Subject to any disclaimer, the term of this patent is extended or adjusted under 35 U.S.C. 154(b) by 354 days.

(21) Appl. No.: 12/659,880

(22) Filed: Mar. 24, 2010

(65) Prior Publication Data

US 2011/0238864 A1     Sep. 29, 2011

(51) Int. Cl.
*G06F 15/16* (2006.01)

(52) U.S. Cl.
USPC ............................................ 709/227

(58) Field of Classification Search
USPC ............................................ 709/227
See application file for complete search history.

(56) References Cited

U.S. PATENT DOCUMENTS

| | | | | |
|---|---|---|---|---|
| 7,313,631 | B1* | 12/2007 | Sesmun et al. | 709/245 |
| 7,562,148 | B2* | 7/2009 | Metke et al. | 709/228 |
| 7,574,508 | B1* | 8/2009 | Kommula | 709/226 |
| 7,694,016 | B2* | 4/2010 | Halley | 709/244 |
| 2002/0044549 | A1* | 4/2002 | Johansson et al. | 370/386 |
| 2004/0039798 | A1* | 2/2004 | Hotz et al. | 709/219 |
| 2007/0253377 | A1 | 11/2007 | Janneteau et al. | |
| 2011/0055923 | A1* | 3/2011 | Thomas | 726/23 |

FOREIGN PATENT DOCUMENTS

EP       1 515 505 A1      3/2005

OTHER PUBLICATIONS

International Search Report dated Sep. 6, 2011, in corresponding International Patent Application No. PCT/US2011/028588.
Japanese Office Action dated Sep. 3, 2013 issued in JP 2013-501308 (with translation).

* cited by examiner

*Primary Examiner* — Alicia Baturay
(74) *Attorney, Agent, or Firm* — Harness, Dickey & Pierce

(57) ABSTRACT

The present invention relates to a system and domain name server for ad-hoc networks. Embodiments of the present invention provide a mobile router providing connectivity to end users in an ad-hoc network. The mobile router includes a domain name server (DNS server) configured as a master DNS server at a node associated with the mobile router for end users that enter the ad-hoc network through the node. The DNS server stores records of name-address translations for the end users. A management structure of the DNS server at the node includes a domain name for the node coinciding with a domain name at a lowest level in a hierarchy of a domain name system.

22 Claims, 3 Drawing Sheets

SYSTEM AND DOMAIN NAME SERVER FOR AD-HOC NETWORKS

BACKGROUND

A domain name system (DNS) is a hierarchical, distributed database used by data communication networks for storing various information necessary for network operation. Most commonly, the DNS system translates node names meaningful to humans into numerical identifiers/addresses associated with network equipment for the purpose of locating and addressing these devices. In other words, the DNS system may be analogized as an electronic telephone book that uses domain names to find network addresses (e.g., IP addresses) and network addresses to find domain names.

Conventional DNS systems use a static tree structure closely tied to a network topology. For instance, domain names (e.g., www.example.com) are hierarchical and each part of a domain name is referred to as either the root, top level, second level, or as a sub-domain depending on location and/or function, for example. Moreover, the responsibility for managing a level or collection of levels (subdomains) is usually delegated to an autonomous administrative authority, thus creating a zone.

Topological zone information in a DNS server are stored in a static configuration file, which requires manual reconfiguration if the network topology changes. The topological zone information in DNS servers includes name-IP address mappings, for example. If a participant of the network wishes to locate the IP address of another participant, the DNS process starts with the DNS server lower on the DNS tree structure and continues to move up and down the DNS tree structure until that information or record is found. Therefore, the static DNS system is sensitive to changes as to the number and location of DNS participants in the network.

However, in ad-hoc networks, the conventional DNS systems are difficult to configure and maintain due to unpredictable and changing topology, and unpredictable node connectivity. For example, ad-hoc networks allow individual nodes and sub-networks (e.g., entire DNS domains) to dynamically join or disjoin the ad-hoc network. In presence of such disruptions, the ad-hoc network must continue operating and assure reachability for all end-systems and services that are connected.

SUMMARY

The present invention relates to a system and domain name server for ad-hoc networks.

Embodiments of the present invention provide a mobile router providing connectivity to end users in an ad-hoc network. The mobile router includes a domain name server (DNS server) configured as a master DNS server at a node associated with the mobile router for end users that enter the ad-hoc network through the node. The DNS server stores records of name-address translations for the end users. A management structure of the DNS server at the node includes a domain name for the node coinciding with a domain name at a lowest level in a hierarchy of a domain name system.

In one embodiment, the management structure of the DNS server further includes an umbrella organization associated with an administrative authority. The umbrella organization includes at least one node. The DNS server is configured to create an alias record for each of the end users irrespective of which node the end users enter the ad-hoc network, where the alias record includes a domain name for the umbrella organization and not the domain name for the node.

The mobile router may form a cluster with at least one other mobile router. In one embodiment, the umbrella organization of the DNS server may be different from an umbrella organization associated with the at least one other mobile router.

In another embodiment, the node associated with the mobile router is designated as a primary node, where the primary node provides lookup queries for addresses outside the umbrella organization of the mobile router. If the node associated with the mobile router is the primary node, the DNS server transmits identity information identifying the node as the designated primary node to the at least one other mobile router in the cluster. The DNS server receives at least one record from the at least one other mobile router in the cluster in response to the transmitted identity information, and stores the at least one record as a pointer in the DNS server. Also, the DNS server may store a forwarder entry pointing to a public DNS server for lookup queries outside the cluster. If the node associated with the mobile router is a non-primary node, the DNS server stores a forwarder entry pointing to a DNS server located at a primary node. Also, the node associated with the mobile router may be designated as a gateway node, where the gateway node provides connectivity to the internet.

Embodiments of the present invention also provide an ad-hoc network providing connectivity to end users. The ad-hoc network includes a first domain name server (DNS server) configured as a master DNS server at a first node associated with a first mobile router for end users that enter the ad-hoc network through the first node, and a second DNS server configured as a master DNS server at a second node associated with a second mobile router for end users that enter the ad-hoc network though the second node. The first and second DNS servers stores records of name-address translations for the end users. A management structure of each of the first and second DNS servers includes a domain name for each of the first and second nodes coinciding with a domain name at a lowest level in a hierarchy of a domain name system, where the first mobile router forms a cluster with the second mobile router.

In one embodiment, the management structure of each of the first DNS server and the second DNS server includes an umbrella organization associated with an administrative authority, where the umbrella organization includes at least one node. The first DNS server creates a first alias record for each of the end users that enter the network through the first node, and the second DNS server creates a second alias record for each of the end users that enter the network through the second node. The first and second alias records include a domain name for the umbrella organization and not the domain name for the first node or the second node.

In another embodiment, the administrative authority of the first DNS server may be different from the administrative authority of the second DNS server.

One of the first node and the second node in the cluster is designated as a primary node, where the primary node provides lookup queries for addresses outside the umbrella organization of at least one of the first mobile router and the second mobile router. One of the first DNS server and the second DNS server which is associated with the primary node transmits identity information identifying which node is the designated primary node to one of the first DNS server and the second DNS server which is associated with the non-primary node. One of the first DNS server and the second DNS server which is associated with the non-primary node stores a forwarder entry pointing to the primary node and transmits at least one record to one of the first DNS server and the second DNS server which is associated with the primary node in response to the transmitted identity information. One of the first DNS server and the second DNS server which is associated with the primary node stores the at least one record as a pointer.

In another embodiment, one of the first node and the second node in the cluster is designated as a gateway node, where the gateway node provides internet connectivity for the cluster. A location of the gateway node is distributed to one of the first node and the second node in the cluster associated with a primary node, and a forwarder entry pointing to the gateway node is stored at the DNS server associated with the primary node. Lookup queries for domain names residing outside of the cluster are forwarded to the gateway node via the primary node.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the present invention, and wherein.

DETAILED DESCRIPTION OF EXAMPLE EMBODIMENTS

Figure 1:
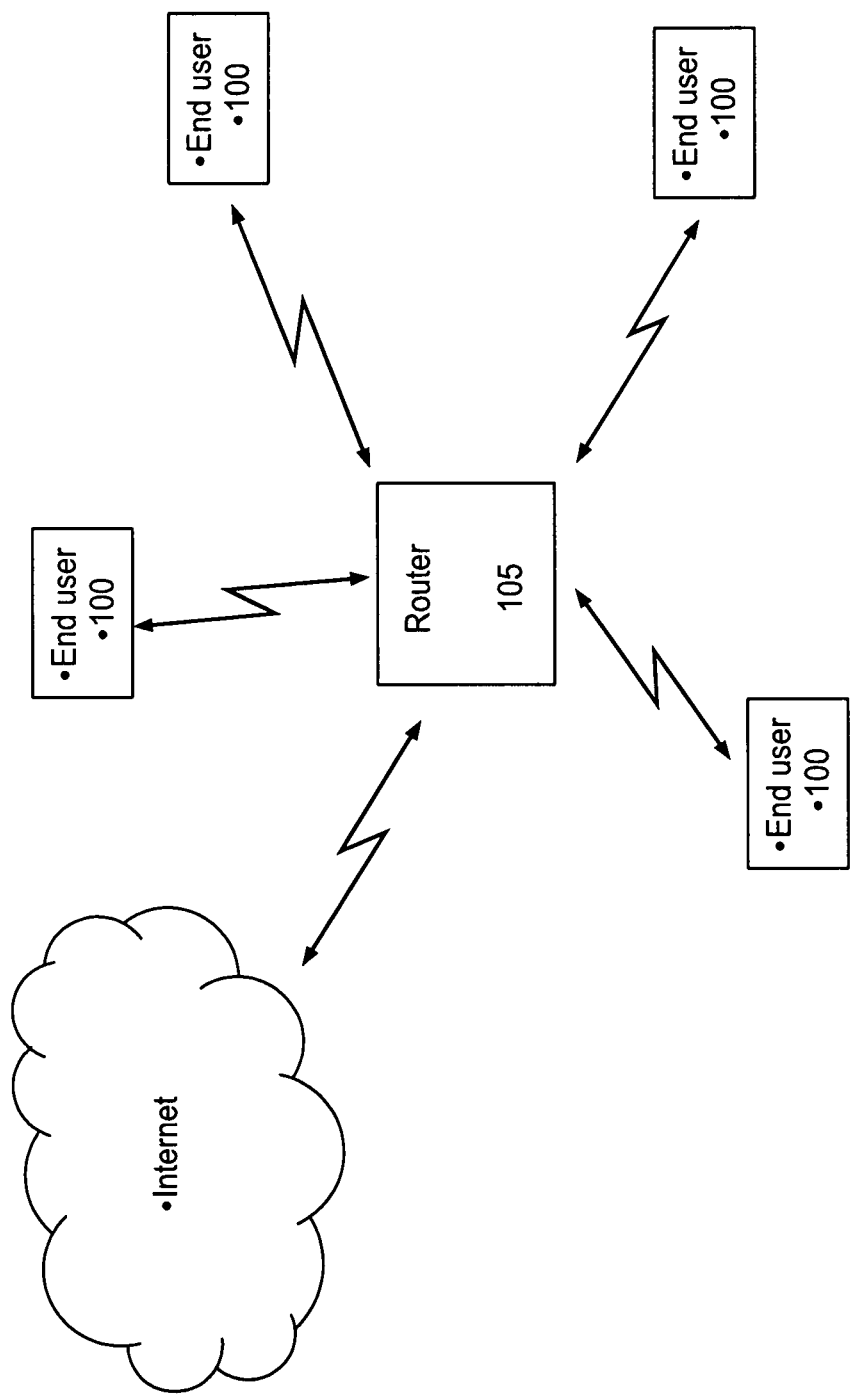
FIG. 1 illustrates a single ad-hoc network node according to an embodiment of the present invention.

Various embodiments of the present invention will now be described more fully with reference to the accompanying drawings in which some embodiments of the invention are shown. Like numbers refer to like elements throughout the description of the figures.

As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

Note that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

FIG. 1 illustrates a single ad-hoc network node according to an embodiment of the present invention. In FIG. 1, a mobile router 105 connects a plurality of end users 110 to a network. The mobile router 105 may be any type of networking device that allows the end users 110 to communicate with each and/or connects the end users 110 to a larger network such as the internet via a wired connection and/or a wireless connection. The mobile router 105 is also a network node. The mobile router 105 may be placed on any type of moving vehicle or moving apparatus such as a fire engine or troop carrier, for example. The mobile router 105 is a self-contained communication network, which allows for a full range of communication services to connected end users 110 such as Voice over Internet Protocol (VoIP), location services, sensor data collection and display, for example. Providing these communication services may not be dependent on connectivity to the global internet. Similarly, the availability of these communication services does not depend on connectivity to other like nodes.

Each of the end users 110 may freely join or leave the ad-hoc network by moving into or out of the vicinity of the wireless coverage of the mobile router 105 if the mobile router 105 is a wireless mobile router. For example, the mobile router 105 provides communication services to any end users 110 within a certain range of the mobile router 105. As a result, the end users 110 may communicate with each other via the mobile router 105. Each of the end users 110 may be connected to the mobile router 105 according to any type of conventional wireless technology such as WiFi™, Worldwide Interoperability for Microwave Access (WiMax), Evolution-Data Optimized (EVDO), Universal Mobile Telecommunications System (UMTS), Long Term Evolution (LTE), for example. Also, the end users 110 may freely join or leave the network by connecting to or disconnecting from the mobile router 105 via a wired connection such as Ethernet, for example. The end users 110 include any type of wireless and/or wired device such as mobile communication devices, computers, head-sets, cell phones, and (wearable) sensors, for example.

The mobile router 105 has the capabilities of operating autonomously or the mobile router 105 can form larger networks (clusters) by setting up communication links (e.g., wireless or wired) with other mobile routers in the vicinity of the mobile router 105, as explained below.

Figure 2:
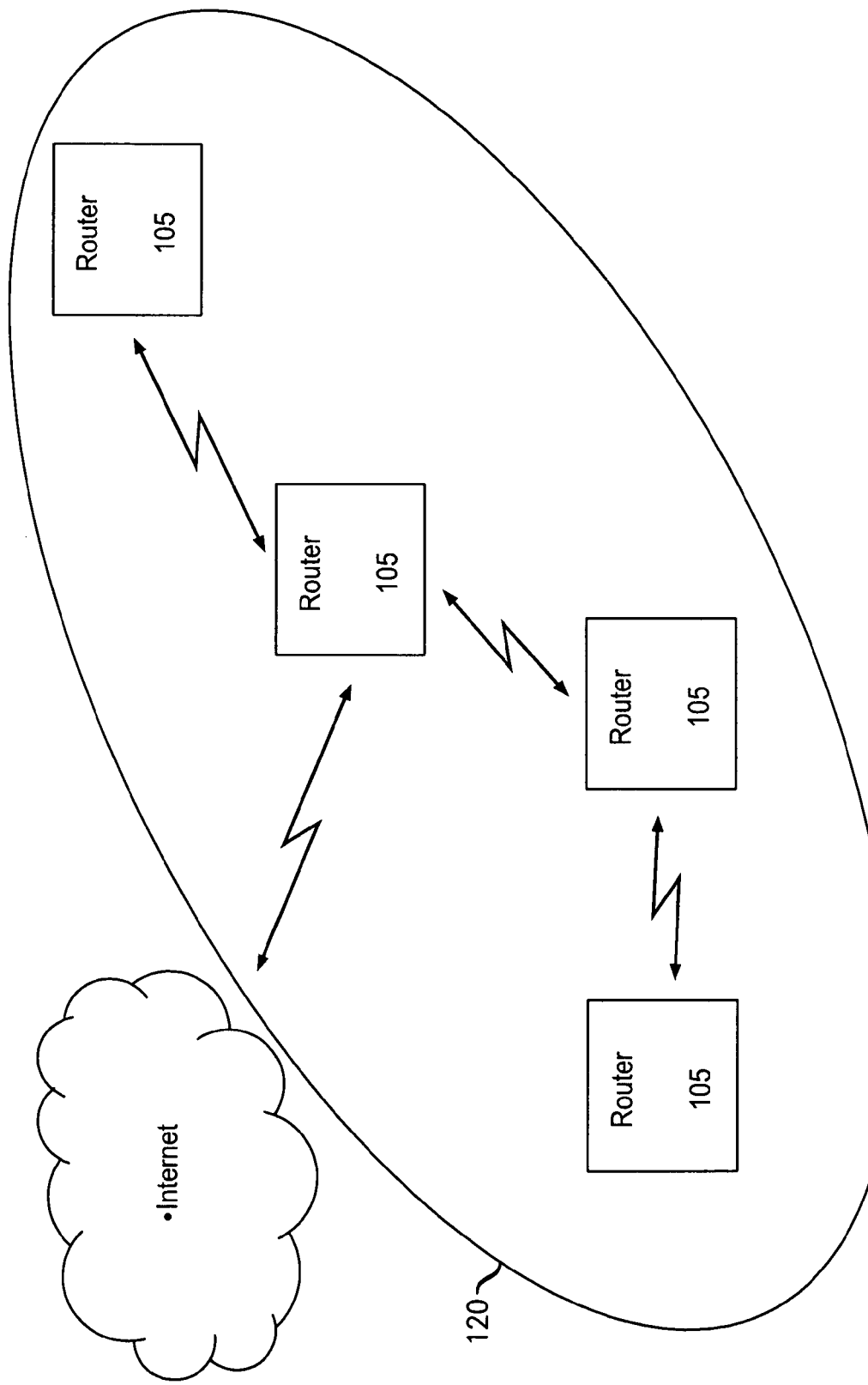
FIG. 2 illustrates a router cluster in an ad-hoc network according to an embodiment of the present invention.

FIG. 2 illustrates a router cluster 120 in an ad-hoc network according to an embodiment of the present invention. The router cluster 120 includes a plurality of mobile routers 105 that are connected via wireless connections. For example, if one mobile router 105 moves into the wireless vicinity of another mobile router 105, both the mobile routers 105 may form a cluster allowing communication between the end users 110 associated with both mobile routers 105. In this particular example, four mobile routers 105 form one cluster 120. Although FIG. 2 illustrates four mobile routers 105, example embodiments of the present invention cover any number of mobile routers 105 in a particular cluster.

Also, the mobile routers 105 are allowed to separate from the cluster 120 either individually or in groups. Each cluster may operate in isolation or each cluster may have a connection to the internet. In this example, one of the mobile routers 105 operates as a gateway node to provide internet connectively to all end users 110 of the cluster 120, which is described later in the specification.

In addition to the cluster structure, which is dictated by the physical connections (e.g., wireless or wired) between the mobile routers 105, there may exist an administrative partitioning of the nodes in the ad-hoc network. For example, the cluster 120 may include mobile routers 105 owned by several different administrative authorities. Therefore, the mobile routers 105 may form a cluster irrespective of the administrative authority for each mobile router 105 if the mobile router 105 is authorized by the administrative authority to join the ad-hoc network.

Figure 3:
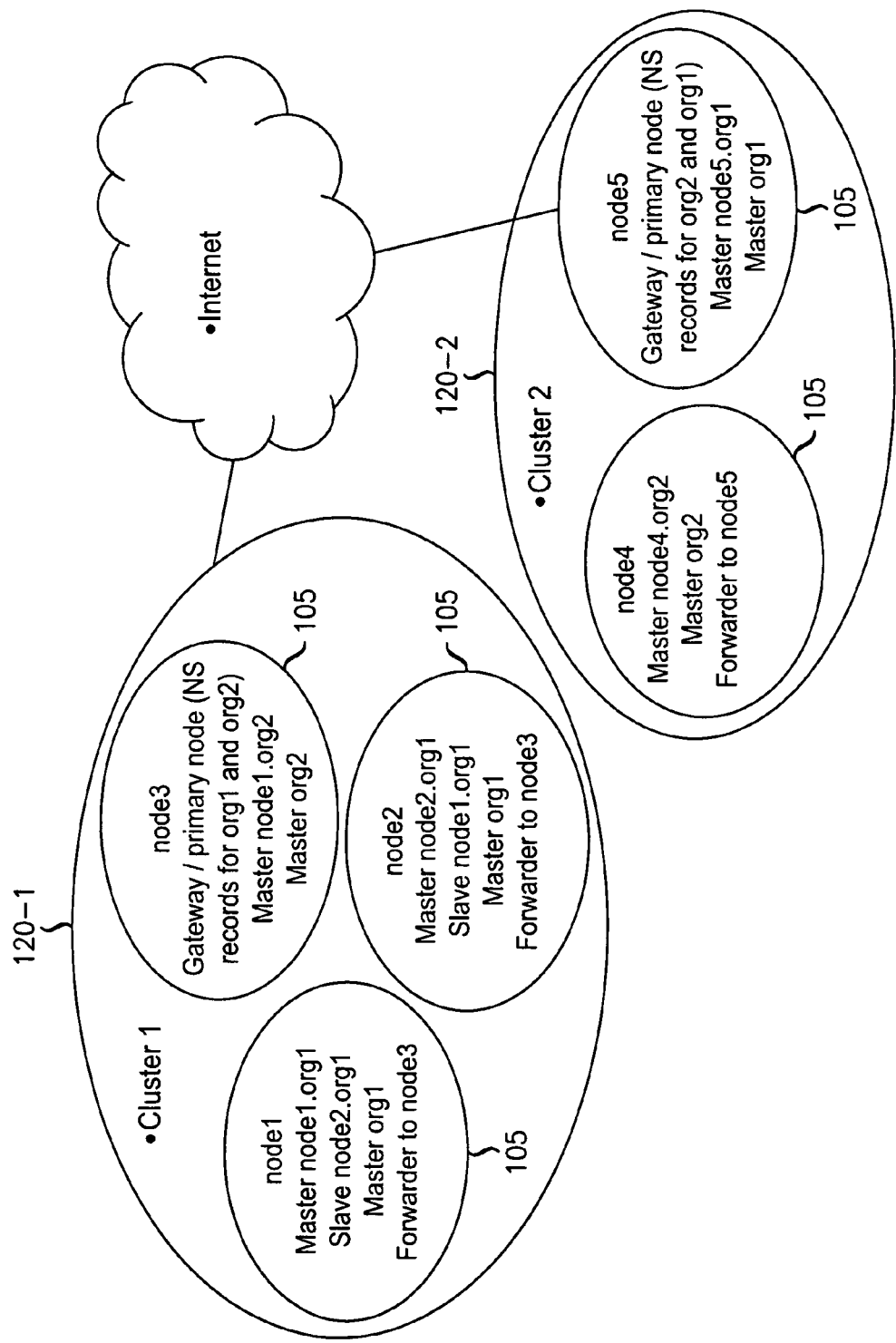
FIG. 3 illustrates a structure of a DNS server implemented at each mobile router in an ad-hoc network according to an embodiment of the present invention.

FIG. 3 illustrates a structure of a DNS server implemented at each mobile router 105 in an ad-hoc network according to an embodiment of the present invention. In FIG. 3, a number of mobile routers 105 form two clusters—a first cluster 120-1 and a second cluster 120-2. Three nodes are illustrated in the first cluster 120-1—"node1", "node2" and "node3." Two nodes are illustrated in the second cluster 120-2—"node4" and "node5." Each of the nodes is associated with a different mobile router 105. Although only two clusters are illustrated in FIG. 3 and a finite number of mobile routers 105 in each cluster 120, example embodiments of the present invention cover any number of clusters and mobile routers 105 through joins and splits, as discussed below.

A DNS server instantiated at each mobile router 105 is configured as a master DNS server in order to allow the node associated with the mobile router 105 to operate autonomously. The master DNS server stores records of name-address translations for the end users 110. In other words, the DNS server is configured as a master DNS server at the node associated with the mobile router for end users 110 that entered the ad-hoc network through the node. The master DNS server is a server that collects information about new end users 110 or new nodes coming into the ad-hoc network and disseminates that information to slave DNS servers.

The master DNS server is implemented in a configuration file on each of the mobile routers 105 through Berkeley Internet Name Domain (BIND) implementation, for example. However, other types of implementation may be used to implement a master DNS server on each of the mobile routers 105. All dynamic record updates are sent only to the master DNS servers. All other DNS servers on other nodes belonging to the same organization (e.g., administrative authority) are configured as slave servers for that zone. DNS slave servers are used to further distribute DNS information, and allow for node-local DNS lookups within each administrative domain. This allows for greater reliability and lower load on inter-router links as the DNS queries do not cross bandwidth constrained inter-node links. In presence of intermittent inter-router connectivity, slave server node placement allows for continuous DNS operation at the organization level.

The management structure of the DNS server at the node associated with mobile router 105 includes a domain name (e.g., node1, node2, node3, node4, or node5) for the node coinciding with a unique domain name at the lowest level in the hierarchy of the DNS system. In other words, the master DNS server is placed on a node at the lowest end of the tree structure in the DNS system. As a result, each node associated with the mobile router 105 is considered independent and autonomous. For example, in "node1" in the first cluster 120-1, "master node1.org1" refers to the DNS server being configured as a master server for end users 110 that enter through node1. Similarly, "master node2.org1" refers to the DNS server being configured as a master DNS server for end users 110 that enter through node2.

In addition to the normal DNS management structure behavior, the management structure of the master DNS server further includes an umbrella organization associated with an administrative authority. The umbrella organization includes at least one node. For example, referring to FIG. 3, "org1" refers to a particular administrative authority, whereas "org2" refers to a different administrative authority. Also, each organization may include multiple nodes, in which there will be n sub-domains existing in the respective organization (e.g., node1.org1, node2.org1, etc). As stated above, "node 1" is the domain name that refers to an individual mobile router 105. The umbrella domain name "Org1" is a higher level domain name that refers to the administrative authority. The domain name org1 may be referred to as an umbrella organization. The umbrella domain org1 allows all nodes to be addressable in the domain org1. In other words, all nodes are addressable in a manner independent of their point of entry and attachment to the network, which is described below with respect to alia records. The organization domain name is setup by the authorization authority.

In a more descriptive example, suppose that the domain name for a particular firefighter within the ad-hoc network is john@cityfiredepartment.firetruck1.com. The domain name "cityfiredepartment" is considered the umbrella domain, whereas the domain name "firetruck1" is considered the domain associated with the mobile router 105 that is placed on a lowest end of the hierarchy. The umbrella domain name and the domain name for the mobile router 105 are preconfigured by the authorization authority associated with "cityfiredepartment."

The master DNS server autonomously creates an alias record at the node for each of the end users 110 irrespective of which node the end users 110 enter the ad-hoc network. The alias record includes a domain name for the umbrella organization and not the domain for the node. For example, when an end user 110 enters the ad-hoc network, the end user 110 registers with the node associated with the mobile router 105 and is named in a manner dependent of the network entry point e.g. host1.node1.org1.gov. In addition, the master DNS server autonomously creates an alias record in the umbrella domain i.e. host1.org1.gov independent of its entry to the ad-hoc network. This allows the node to be referred to in a manner independent of its current point of attachment to the network (cluster). Moreover, the umbrella entries are not sent and synchronized with the slave servers, as slave DNS servers are capable of autonomous and/or unassisted recreation of the alia records based on data received in regular zone transfers.

The domain management structure described above allows each of the nodes to be deployed individually or in any combination, even in multiple clusters. For example, there could be two organization domains in existence simultaneously in two different unconnected clusters. Referring to FIG. 3, such a situation exists for both org1 and org2, both of which have two separate instantiations in the first cluster 120-1 and the second cluster 120-2. The domain management structure described here allows the two organization domains to merge seamlessly once clusters containing these domains merge. All cluster joins and splits are performed without any reconfiguration to the organization level configuration data.

Also, as part of standard DNS operation, the DNS server transmits the records stored at the DNS server to a slave DNS server associated with another node in the organization if the slave DNS server joins the ad-hoc network cluster. For example, a zone transfer occurs automatically at the time of cluster formation as all nodes within an administrative organization are preconfigured as slave DNS servers for all node level domains for which the mobile routers 105 are not masters DNS servers.

In each of the first cluster 120-1 and the second cluster 120-2, one node is designated as a primary node for providing lookup queries for addresses outside their respective umbrella organization. Referring to FIG. 3, node3 in the first cluster 120-1 and node5 in the second cluster 120-2 are designated as primary nodes in their respective clusters. The primary node stores a pointer (e.g. name-server (NS) record and/or delegation) for the non-designated nodes in the cluster. The signaling between the DNS server at the primary node and the DNS servers for the non-primary nodes are discussed below.

For example, upon cluster formation and following the primary node election by the cluster, the DNS server of the primary node transmits identity information identifying the node as the designated primary node to the other nodes in the cluster. The other mobile routers 105 associated with the non-primary node receive identity information of the primary node and store a forwarder entry. For example, each DNS server associated with the non-primary nodes stores a forwarder record pointing to the DNS server at the primary node of the cluster based on the identity information received from the primary node. A forwarder entry may be added at each DNS server of the non-primary nodes to allow for forwarding of DNS queries to other zones as well as to outside (e.g., public) Internet servers. Referring to FIG. 3, node 1 and node2 include forwarder entries for node3 in the first cluster 120-1. Similarly, node4 includes forwarder entry for node5 in the second cluster 120-2.

Upon receipt of the identity information, each mobile router 105 of the non-primary nodes transmits a message to the primary node allowing for creation of a Start of Authority (SOA) resource record and NS record for its respective zone. For example, the message includes at least includes the zone name, identity and/or fully qualified domain name (FQDN) of the primary master server and the IP address of the mobile router 105. The lookup queries for addresses outside of the organization zone (e.g., in FIG. 3, the DNS queries from nodes in domain .org1 about nodes in domain .org2 or nodes in the public internet) are forwarded to the primary node. Also, in one embodiment, forwarder entries may be installed at the DNS server of the primary nodes pointing to a gateway node to allow for lookup queries outside the cluster via a gateway node. Also, in another embodiment, forwarder entries may be installed at the DNS server of the primary nodes pointing to a public DNS (e.g., a service provider's backhaul).

When the existing primary node departs from the cluster, a new primary node is elected. When a new primary node is elected, the process is repeated. This non-standard DNS server behavior allows for dynamic addition and deletion of the SOA and NS records.

One node in each of the first cluster 120-1 and the second cluster 120-2 may be designated as a gateway node. For instance, one node is elected as a gateway node for the first cluster 120-1 and one node is elected as a gateway node for the second cluster 120-2. Referring to FIG. 3, the primary nodes (e.g., node3 and node5) are designated as gateway nodes as well. However, the designated gateway nodes may be different from the primary nodes. The gateway node provides internet connectivity for the first cluster 120-1 and the second cluster 120-2.

Once a node is elected as a gateway for the cluster, location information of the gateway node is distributed from the DNS server of the gateway node to the DNS server associated with the primary node. In response to the location information, a forwarder entry pointing to the gateway node is stored at the DNS server associated with the primary node. Also, a forwarder entry is installed at the DNS server of the gateway node. The forwarder entry points to a public DNS (e.g., a service provider's backhaul) to allow for lookup queries outside the cluster. As a result, if the DNS query cannot be resolved within all organization and/or zones in the cluster, the DNS queries are then forwarded to the gateway node and then to a public DNS server.

Variations of the example embodiments of the present invention are not to be regarded as a departure from the spirit and scope of the example embodiments of the invention, and all such variations as would be apparent to one skilled in the art are intended to be included within the scope of this invention.

What is claimed is:

1. A mobile router providing connectivity to end users in an ad-hoc network, the mobile router including:
   a domain name server (DNS server) configured as a master DNS server at a node associated with the mobile router for end users that enter the ad-hoc network through the node, the DNS server configured to,
   store records of name-address translations for the end users, a management structure of the DNS server at the node including a domain name for the node coinciding with a domain name at a lowest level in a hierarchy of a domain name system, and
   create an alias record for each of the end users, the alias record includes a higher level domain name and not the domain name for the node.

2. The mobile router of claim 1, wherein the management structure of the DNS server further includes an umbrella organization associated with an administrative authority, the higher level domain name being associated with the umbrella organization.

3. The mobile router of claim 2, wherein the DNS server is configured to create the alias record for each of the end users irrespective of which node the end users enter the ad-hoc network.

4. The mobile router of claim 2, wherein the mobile router forms a cluster with at least one other mobile router.

5. The mobile router of claim 4, wherein the umbrella organization of the DNS server is different from an umbrella organization associated with the at least one other mobile router.

6. The mobile router of claim 4, wherein the node associated with the mobile router is designated as a primary node, the primary node provides lookup queries for addresses outside the umbrella organization of the mobile router.

7. The mobile router of claim 6, wherein the DNS server transmits identity information identifying the node as the designated primary node to the at least one other mobile router in the cluster.

8. The mobile router of claim 7, wherein the DNS server receives at least one record from the at least one other mobile router in the cluster in response to the transmitted identity information, and stores the at least one record as a pointer in the DNS server.

9. The mobile router of claim 6, wherein the DNS server further stores a forwarder entry pointing to a public DNS server for lookup queries outside the cluster.

10. The mobile router of claim 4, wherein if the node associated with the mobile router is a non-primary node, the DNS server stores a forwarder entry pointing to a DNS server located at a primary node.

11. The mobile router of claim 4, wherein the node associated with the mobile router is designated as a gateway node, the gateway node provides connectivity to the internet.

12. An ad-hoc network providing connectivity to end users, the ad-hoc network including:
    a first domain name server (DNS server) configured as a master DNS server at a first node associated with a first mobile router for end users that enter the ad-hoc network through the first node; and
    a second DNS server configured as a master DNS server at a second node associated with a second mobile router for end users that enter the ad-hoc network though the second node, the first and second DNS servers configured to,
    store records of name-address translations for the end users, a management structure of each of the first and second DNS servers including a domain name for each of the first and second nodes coinciding with a domain name at a lowest level in a hierarchy of a domain name system, the first mobile router forming a cluster with the second mobile router, and
    create an alias record for each of the end users, the alias record includes a higher level domain name and not the domain name for each of the first and second nodes.

13. The ad-hoc network of claim 12, wherein the management structure of each of the first DNS server and the second DNS server includes an umbrella organization associated with an administrative authority, the umbrella organization includes at least one node.

14. The ad-hoc network of claim 13, wherein the first DNS server creates a first alias record for each of the end users that enter the network through the first node, and the second DNS server creates a second alias record for each of the end users that enter the network through the second node, the first and second alias records include a domain name for the umbrella organization and not the domain name for the first node or the second node.

15. The ad-hoc network of claim 13, wherein the administrative authority of the first DNS server is different from the administrative authority of the second DNS server.

16. The ad-hoc network of claim 13, wherein one of the first node and the second node in the cluster is designated as a primary node, the primary node provides lookup queries for addresses outside the umbrella organization of at least one of the first mobile router and the second mobile router.

17. The ad-hoc network of claim 16, wherein
    one of the first DNS server and the second DNS server which is associated with the primary node transmits identity information identifying which node is the designated primary node to one of the first DNS server and the second DNS server which is associated with the non-primary node;
    one of the first DNS server and the second DNS server which is associated with the non-primary node stores a forward entry pointing to the primary node and transmits at least one record to one of the first DNS server and the second DNS server which is associated with the primary node in response to the transmitted identity information; and
    one of the first DNS server and the second DNS server which is associated with the primary node stores the at least one record as a pointer.

18. The ad-hoc network of claim 12, wherein one of the first node and the second node in the cluster is designated as a gateway node, the gateway node provides internet connectivity for the cluster.

19. The ad-hoc network of claim 18, wherein a location of the gateway node is distributed to one of the first node and the second node in the cluster associated with a primary node, and a forwarder entry pointing to the gateway node is stored at the DNS server associated with the primary node.

20. The ad-hoc network of claim 19, wherein lookup queries for domain names residing outside of the cluster are forwarded to the gateway node via the primary node.

21. A mobile router providing connectivity to end users in an ad-hoc network, the mobile router including:
    a domain name server (DNS server) configured as a master DNS server at a node associated with the mobile router for end users that enter the ad-hoc network through the node, the DNS server configured to store records of name-address translations for the end users, a management structure of the DNS server at the node including a domain name for the node coinciding with a domain name at a lowest level in a hierarchy of a domain name system,
    wherein the management structure of the DNS server further includes an umbrella organization associated with an administrative authority, the umbrella organization includes at least one node, and the umbrella organization of the DNS server is different from an umbrella organization associated with the at least one other mobile router.

22. A mobile router providing connectivity to end users in an ad-hoc network, the mobile router including:
    a domain name server (DNS server) configured as a master DNS server at a node associated with the mobile router for end users that enter the ad-hoc network through the node, the DNS server configured to store records of name-address translations for the end users, a management structure of the DNS server at the node including a domain name for the node coinciding with a domain name at a lowest level in a hierarchy of a domain name system,
    wherein the management structure of the DNS server further includes an umbrella organization associated with an administrative authority, the umbrella organization includes at least one node, and the node associated with the mobile router is designated as a primary node, the primary node provides lookup queries for addresses outside the umbrella organization of the mobile router.

* * * * *